United States Patent
Wyatt

(10) Patent No.: US 10,935,175 B2
(45) Date of Patent: *Mar. 2, 2021

(54) LOW EMISSION FLUID COUPLER

(71) Applicant: Engineered Controls International, LLC, Elon, NC (US)

(72) Inventor: Aaron Dominic Wyatt, Hillsborough, NC (US)

(73) Assignee: Engineered Controls International, LLC, Elon, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/226,176

(22) Filed: Dec. 19, 2018

(65) Prior Publication Data
US 2019/0120412 A1 Apr. 25, 2019

Related U.S. Application Data

(63) Continuation of application No. 15/371,353, filed on Dec. 7, 2016, now Pat. No. 10,190,711.
(Continued)

(51) Int. Cl.
*F16L 29/02* (2006.01)
*F17C 1/00* (2006.01)
(Continued)

(52) U.S. Cl.
CPC .............. *F16L 29/02* (2013.01); *B60K 15/00* (2013.01); *F16K 1/38* (2013.01); *F16K 17/00* (2013.01);
(Continued)

(58) Field of Classification Search
CPC . F16L 29/02; F16L 29/00; F16L 29/04; F16L 15/006; F16L 37/35; F16L 37/42;
(Continued)

(56) References Cited

U.S. PATENT DOCUMENTS 2,337,096 A 12/1943 Geiger
2,339,746 A 1/1944 Marchus
(Continued)

FOREIGN PATENT DOCUMENTS

CN 1639499 7/2005
CN 101424365 5/2009
(Continued)

OTHER PUBLICATIONS

International Search Report and Written Opinion for PCT/US2016/065249 dated Mar. 21, 2017.
(Continued)

*Primary Examiner* — David Colon-Morales
(74) *Attorney, Agent, or Firm* — Neal, Gerber & Eisenberg LLP

(57) ABSTRACT

A fluid coupler includes: an outer body; an end connector being at least partially received inside the outer body and configured to receive pressurized fluid; an inner body received inside the outer body, the inner body being moveable with respect to the outer body; a seat holder and a valve seat both located inside of the inner body, the valve seat being configured to press against an inner surface of the inner body to close the fluid coupler; a connector partially housed within the inner body, the connector comprising a first end secured to the seat holder and a second end. The fluid coupler defines a pressurized fluid flow path enabling pressurized fluid to contact and pressurize the end connector, the inner body, the seat holder, and the connector without contacting and pressurizing the outer body.

19 Claims, 7 Drawing Sheets

Related U.S. Application Data

(60) Provisional application No. 62/264,058, filed on Dec. 7, 2015.

(51) Int. Cl.
  *F16L 15/00* (2006.01)
  *B60K 15/00* (2006.01)
  *F16K 1/38* (2006.01)
  *F16K 17/00* (2006.01)

(52) U.S. Cl.
  CPC .............. *F16L 15/006* (2013.01); *F17C 1/00* (2013.01); *F17C 2205/037* (2013.01)

(58) Field of Classification Search
  CPC ........ F17C 2205/037; F16K 1/38; F16K 1/36; F16K 1/46
  See application file for complete search history.

(56) References Cited

U.S. PATENT DOCUMENTS

| | | | | |
|---|---|---|---|---|
| 2,412,685 A | | 12/1946 | Hoffman et al. | |
| 2,456,045 A | * | 12/1948 | Brock | F16L 29/04 |
| | | | | 137/614.03 |
| 2,678,834 A | * | 5/1954 | Courtot | F16L 37/101 |
| | | | | 137/614.02 |
| 2,819,912 A | | 1/1958 | Mitchell | |
| 2,842,381 A | | 7/1958 | Franck | |
| 2,919,935 A | | 1/1960 | Nyberg | |
| 2,931,668 A | | 4/1960 | Baley | |
| 2,936,183 A | | 5/1960 | Basham | |
| 3,446,245 A | | 5/1969 | Snyder, Jr. | |
| 3,706,318 A | * | 12/1972 | Baniadam | F16L 29/04 |
| | | | | 137/614.03 |
| 3,712,583 A | | 1/1973 | Martindale et al. | |
| 3,807,687 A | | 4/1974 | Thompson | |
| 4,269,389 A | * | 5/1981 | Ekman | F16L 37/23 |
| | | | | 137/614.03 |
| 4,328,948 A | | 5/1982 | Pearl, II | |
| 4,527,587 A | | 7/1985 | Fairlamb | |
| 4,949,745 A | * | 8/1990 | McKeon | F16L 37/23 |
| | | | | 137/15.09 |
| 5,044,401 A | | 9/1991 | Giesler et al. | |
| 6,464,260 B1 | * | 10/2002 | Barrier | F16L 29/02 |
| | | | | 285/362 |
| 6,962,321 B1 | * | 11/2005 | Savage | B65D 77/067 |
| | | | | 137/614.04 |
| 7,793,914 B2 | * | 9/2010 | Danielson | F16L 37/0848 |
| | | | | 251/149.6 |
| 7,874,314 B2 | * | 1/2011 | Zuck | F16L 29/04 |
| | | | | 137/614.04 |
| 8,186,649 B2 | * | 5/2012 | Aoki | F16L 37/0848 |
| | | | | 251/149.1 |
| 8,851,446 B2 | | 10/2014 | Nimberger | |
| 8,882,080 B2 | | 11/2014 | Tiberghien et al. | |
| 10,190,711 B2 | * | 1/2019 | Wyatt | F16K 1/38 |
| 2005/0001194 A1 | | 1/2005 | Bachelder | |
| 2008/0007058 A1 | * | 1/2008 | Pozzi | F16L 37/1215 |
| | | | | 285/322 |
| 2014/0175314 A1 | | 6/2014 | Bondo et al. | |
| 2015/0247594 A1 | | 9/2015 | Vijayadevaraj et al. | |
| 2015/0369410 A1 | | 12/2015 | Weiland et al. | |

FOREIGN PATENT DOCUMENTS

| | | |
|---|---|---|
| CN | 103124874 | 5/2013 |
| EP | 0927849 | 7/1999 |
| EP | 2505895 | 10/2012 |

OTHER PUBLICATIONS

Office Action for Chinese Patent Application No. 201680070978.2 dated Jun. 3, 2019, 7 pp.

\* cited by examiner

LOW EMISSION FLUID COUPLER

CROSS-REFERENCE

This application is a continuation of U.S. patent application Ser. No. 15/371,353, filed on Dec. 7, 2016, which claims priority to U.S. Provisional Patent Application No. 62/264,058, filed on Dec. 7, 2015, the contents of which are incorporated herein in their entirety.

BACKGROUND

This disclosure generally relates to fluid couplers configured to couple a source of pressurized gas with a fluid receptacle such as a cylinder or a tank while minimizing the unintentional emission of gas during the connection and disconnection processes. A user refills the gas cylinder or tank by tightly screwing the fluid coupler onto the gas cylinder or tank and flowing a fluid, such as a gas, through the fluid coupler into the gas cylinder or tank.

SUMMARY

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

A first embodiment of the present disclosure includes a fixed housing with an end connector secured to a body, an end connector rotatably received in the fixed housing, an inner body secured to the end connector, a seat holder rotatably received in the inner body, a connector secured to the seat holder, and a nipple secured to the connector.

A second embodiment of the present disclosure includes a fixed housing with an end connector and a stop secured to a body, an end connector rotatably received in the fixed housing, an inner body secured to the end connector, a set holder rotatably received in the inner body, a connector secured to the seat holder, and a nipple secured to the connector.

A better understanding of the objects, advantages, features, properties, and relationships of the invention will be obtained from the following detailed description and accompanying drawings, which set forth one or more illustrative embodiments that are indicative of the various ways in which the principles of the invention may be employed.

DETAILED DESCRIPTION

Figure 1:
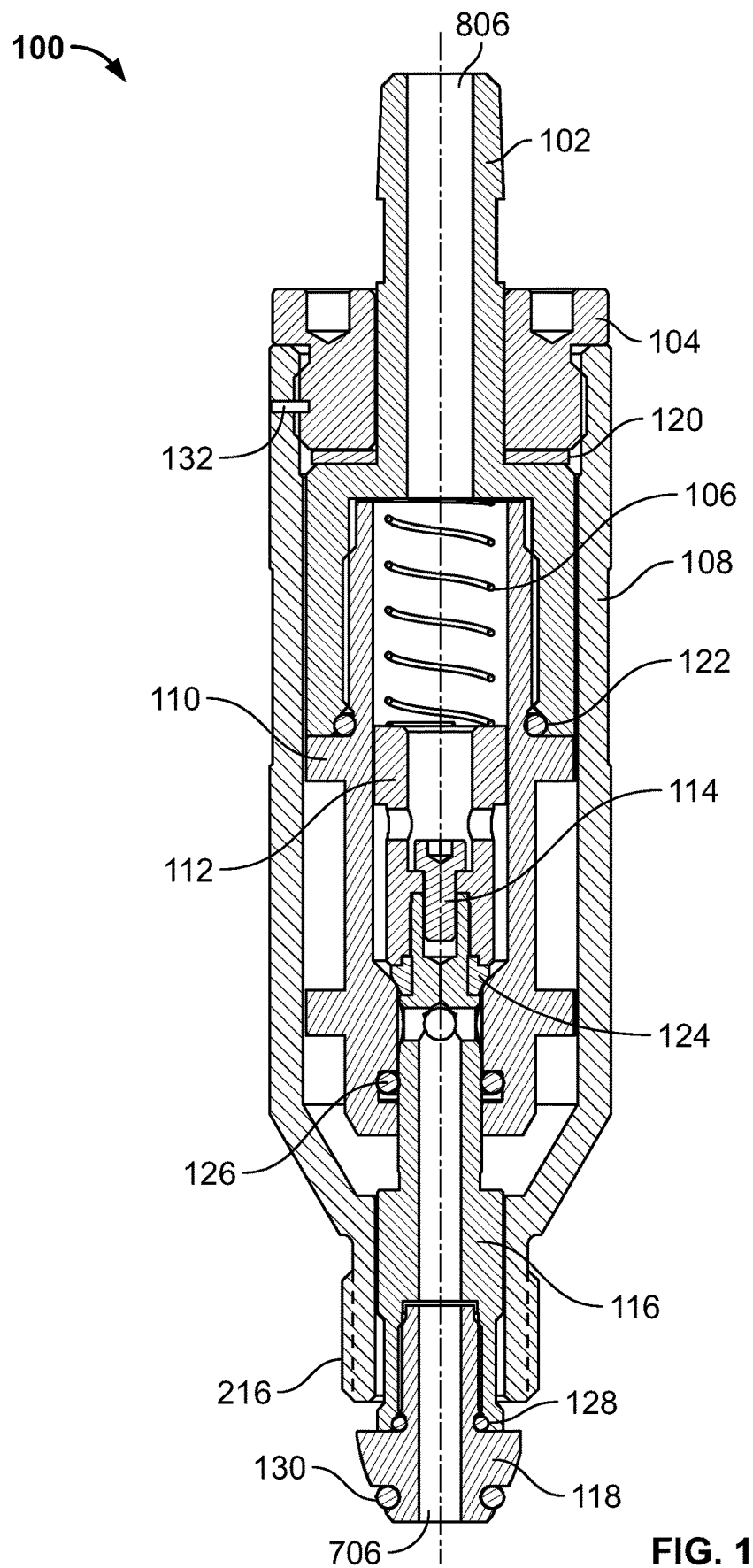
FIG. 1 is a cross-sectional view of a first embodiment of the fluid coupler in accordance with the teachings herein.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

A first embodiment of a fluid coupler 100 is shown and described herein. As shown in FIG. 1, fluid coupler 100 includes an end connector 102 rotatably received in an outer body 108. An end cap 104 is secured to outer body 108 via a pin 132. A circular wear plate 120 fits between end connector 102 and end cap 104.

An inner body 110 threads into end connector 102. The assembly of inner body 110 and end connector 102 can slide as a unit along the longitudinal axis of outer body 108. The assembly can also rotate as a unit with respect to outer body 108.

A seat holder 112 fits inside inner body 110, and a pin or screw 114 binds seat holder 112 to connector 116. A valve seat 124 fits around connector 116 directly underneath seat holder 112, and a spring 106 is disposed in inner body 110 between seat holder 112 and the end connector 102 to bias valve seat 124 to a closed position. A nipple 118 threads into the bottom of connector 116. The assembly of connector 116 and seat holder 112 can slide as a unit along the longitudinal axis of the outer body 108. The assembly of connector 116 and seat holder 112 can also rotate as a unit with respect to both the outer body 108 and the inner body 110. Seat holder 112 may also be referred to as a plug holder, and valve seat 124 may also be referred to as a plug.

A first O-ring 122 is located around inner body 110 in a gap defined by end connector 102 and a second O-ring 126 is located around connector 116 in a gap defined by inner body 110. A third O-ring 128 is located around nipple 118 in a gap defined by connector 116. A fourth O-ring 130 is located in a gap defined in nipple 118. As shown in FIG. 1, fluid coupler 100, excluding pin 132, is generally symmetrical about its longitudinal axis.

In use, male threads 216 (shown in FIG. 2) of outer body 108 fit into female threads of a gas cylinder's receiving slot (not shown). A bottom surface of nipple 118 presses against an upper surface of the gas cylinder's receiving slot, causing the upper surface of the receiving slot to apply an upward force against nipple 118. This upward force is translated to seat holder 112 and opposes a biasing force of spring 106. This upward force enables seat holder 112, connector 116, valve seat 124, and nipple 118 to translate longitudinally or slide with respect to both outer body 108 as well as inner body 110 and end connector 102, thereby opening fluid coupler 100, and enabling fluid to enter fluid coupler 100 through void 806 defined by end connector 102 and exit the fluid coupler through void 706 defined by connector 116 and nipple 118.

More specifically, this sliding motion lifts valve seat 124 from a mating surface of inner body 110, enabling fluid communication between an inside of seat holder 112 and an inside of connector 116. Pressurized fluid may now travel from a hose (not shown) fitted onto the top of end connector 102, through inner body 110, into seat holder 112, out of voids or apertures 410 defined in seat holder 112, into a ring-shaped longitudinally extending gap defined between an outer surface of seat holder 112 and an opposing inner surface of inner body 110, into connector 116 via vents or apertures 520 defined in an exterior wall of connector 116, through connector 116, and exit through nipple 118 into a gas cylinder via the gas cylinder's receiving slot (not shown).

Because inner body 110 and end connector 102 separate or isolate outer body 108 from pressurized fluid, a user can advantageously twist male threads 216 of the outer body 108 into female threads of the gas cylinder's receiving slot (not shown) with ease. If the inner body 110 were absent, pressurized fluid would fill open space defined between seat holder 112 and outer body 108, disadvantageously pressurizing outer body 108. The pressurization of outer body 108 would oppose longitudinal translation of connector 116 into outer body 108 and toward spring 106 during the twisting of male threads 216 into the female threads of the gas cylinder's receiving slot, thus making the twisting process more difficult.

Figure 2:
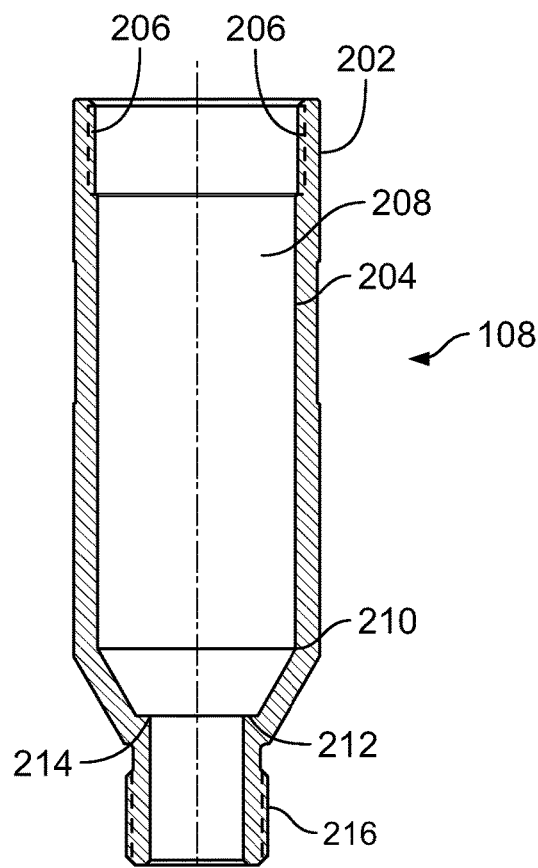
FIG. 2 is a cross-sectional view of the body of the fluid coupler of FIG. 1.

Turning to FIG. 2, outer body 108 has a generally cylindrical outer surface 202 and a generally cylindrical inner surface 204 defining a generally cylindrical inner cavity 208. Inner surface 204 includes female threads 206. At an edge 210, inner surface 204 slopes inward until reaching a ledge 212, which extends inward in the radial direction and terminates at a second circular edge 214. Outer body 108 has a generally constant thickness between outer surface 202 and inner surface 204. Male threads 216 extend along a length of outer surface 202.

Figure 3:
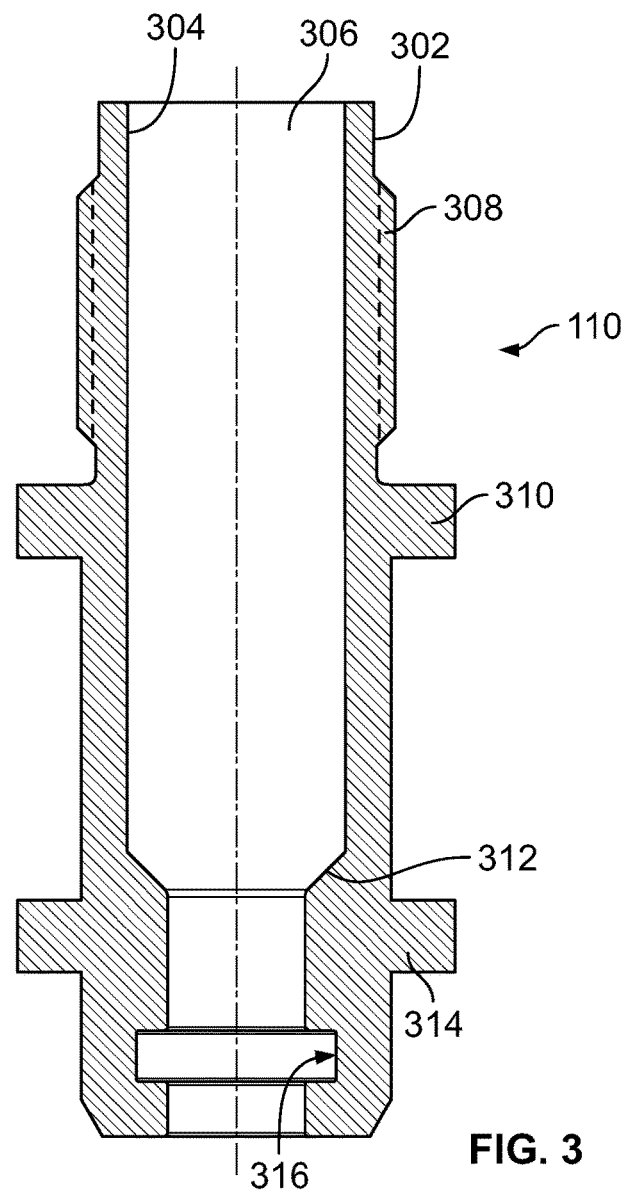
FIG. 3 is a cross-sectional view of the inner body of the fluid coupler of FIG. 1.

With reference to FIGS. 1 and 3, inner body 110 is generally cylindrical with an outer surface 302 and an inner surface 304, which defines a generally cylindrical void 306. Outer surface 302 includes two alignment rings 310 and 314 that align inner body 110 in a substantially vertical direction with respect to outer body 108. Inner surface 304 of inner body 110 slopes to form a mating surface 312 for valve seat 124. Below mating surface 312, inner surface 304 radially retreats or recedes to define an O-ring gap 316 for second O-ring 126.

Figure 4:
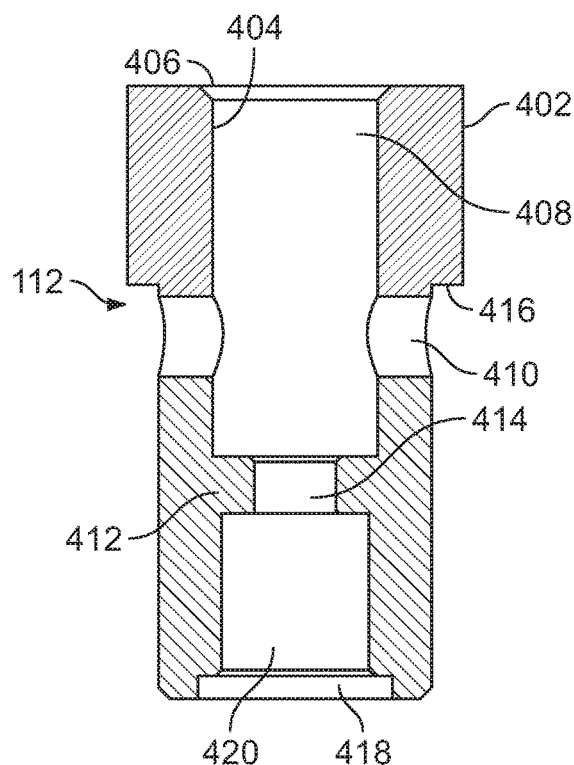
FIG. 4 is a cross-sectional view of the seat holder of the fluid coupler of FIG. 1.

FIG. 4 shows seat holder 112 having an outer surface 402 and an inner surface 404. Inner surface 404 defines a generally cylindrical chamber 408 and slopes inward to define a spring receiving surface 406. As shown in FIG. 1, spring 106 rests on spring receiving surface 406. Outer surface 402 cuts inward to form a shoulder 416.

Seat holder 112 defines two opposing radially extending cylindrical voids 410 below shoulder 416. Other embodiments define any suitable number of radially extending cylindrical voids. For example, in one embodiment, seat holder 112 defines a total of four perpendicular radially extending cylindrical voids 410. During use, fluid flows out of the chamber 408 through radially extending cylindrical voids 410.

Seat holder 112 includes a step 412, and a center of step 412 defines a screw opening 414. Below step 412, seat holder 112 defines a connector void 420, which eventually expands into a valve seat void 418.

Figure 5:
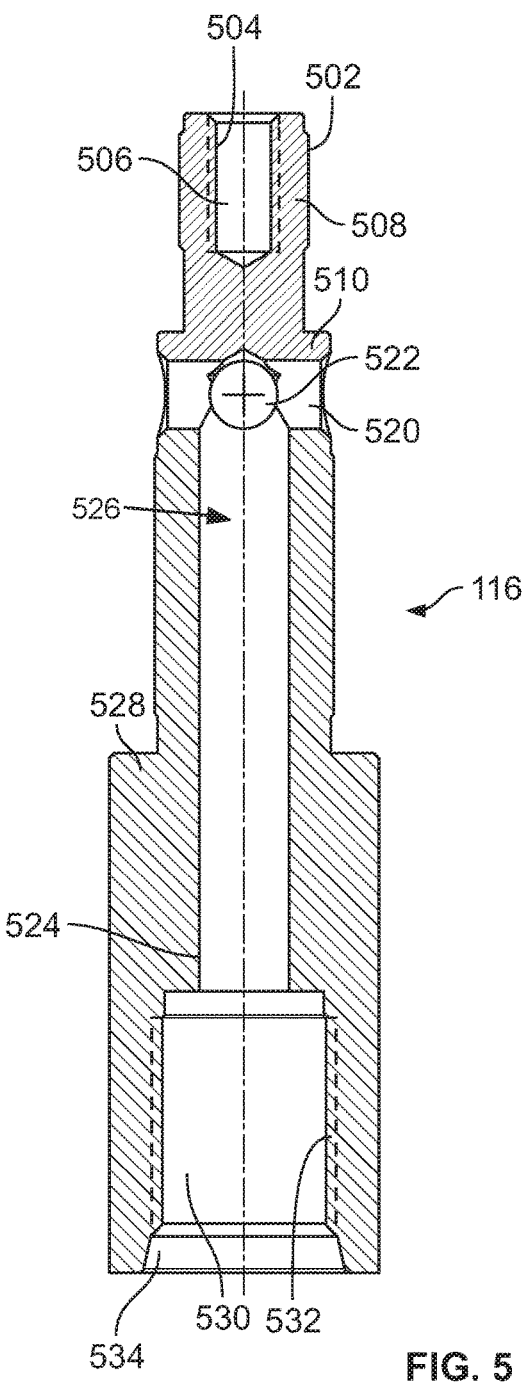
FIG. 5 is a cross-sectional view of the connector of the fluid coupler of FIG. 1.

As shown in FIG. 5, connector 116 includes an inner surface 504 defining a screw void 506. An outer surface 502 of connector 116 widens into a valve seat stop 508. Below valve seat stop 508, outer surface 502 radially retreats or recedes to form a cylindrical surface that contacts an inner cylindrical surface of valve seat 124. Thereafter, outer surface 502 widens into a valve seat ring or shoulder 510. Upon assembly, as shown in FIG. 1, connector 116 fits into connector void 420. Valve seat 124 rests between valve seat stop 508 and valve seat ring 510. An outer surface of valve seat 124 fits against an inner step-shaped surface of seat holder 112 partially defining valve seat void 418 and connector void 420.

Figure 6:
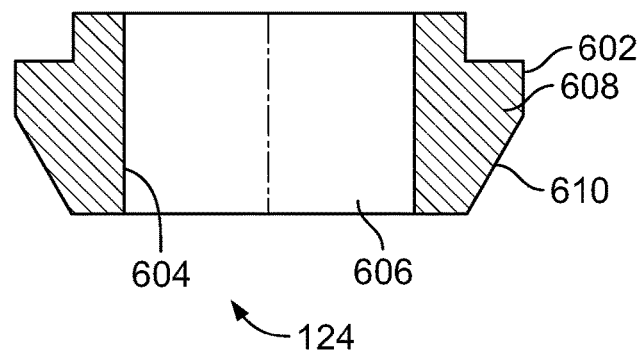
FIG. 6 is a cross-sectional view of the valve seat of the fluid coupler of FIG. 1.

FIG. 6 shows valve seat 124 in greater detail. Valve seat 124 has an outer surface 602 and an inner surface 604. Inner surface 604 defines a generally cylindrical void 606 that receives connector 116. Outer surface 602 widens into a shoulder 608, configured to mate with the surfaces defining the valve seat void 418 of the seat holder 112. Below the shoulder, outer surface 602 slopes into an engagement surface 610. In a closed position, the spring 106 applies downward force against seat holder 112, compressing engagement surface 610 of valve seat 124 against mating surface 312 of inner body 110.

Returning to FIG. 5, connector 116 defines radially extending cylindrical vents 520 under valve seat ring 510. This embodiment defines a total of four perpendicular radially extending cylindrical vents 520. Other embodiments have any suitable number of radially extending cylindrical vents 520. The voids intersect at a void junction 522, defined in the center of connector 116. Below void junction 522, an inner surface 524 of connector 116 defines a cylindrical flow line 526. Outer surface 502 of connector 116 eventually widens into a shoulder 528. As shown in FIG. 1, shoulder 528 is sized to match an inner diameter of outer body 108. With reference to FIG. 5 and according to some embodiments, outer surface 502 may be flat (in the longitudinal direction) below shoulder 528. With reference to FIG. 1, and according to other embodiments, outer surface 502 may radially retreat below shoulder 528 to define a circumferential slot between outer surface 502 and outer body 108. As shown in FIG. 1, outer surface 502 radially expands below the circumferential slot. Although not shown in the Figures, outer surface 502 of connector 116 defines wrench flats adjacent nipple opening 530.

Inner surface 524 of connector 116 defines a cylindrical flow path extending downward from void junction 522 to a nipple opening 530. At nipple opening 530, inner surface 524 radially retreats such that nipple opening 530 is wider than the cylindrical flow path. The portion of inner surface 524 defining nipple opening 530 includes female threads 532. Below nipple opening 530, inner surface 524 further radially retreats to define an O-ring gap 534 for third O-ring 128. As shown in FIG. 1, nipple 118 compresses third O-ring 128 against the portion of inner surface 524 defining O-ring gap 534.

Figure 7:
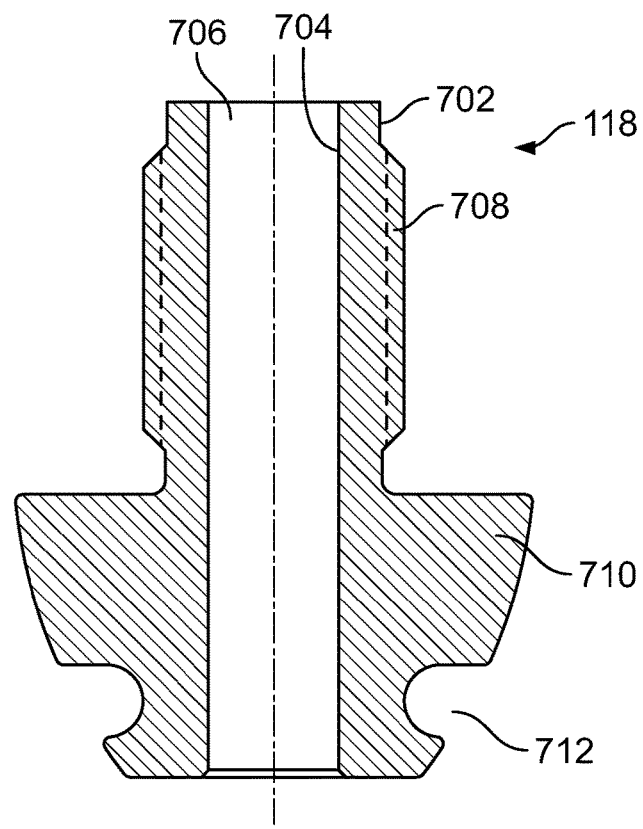
FIG. 7 is a cross-sectional view of the nipple of the fluid coupler of FIG. 1.

FIG. 7 shows nipple 118 in greater detail. Nipple 118 includes an outer surface 702 and an inner surface 704 defining a generally cylindrical void 706. Male threads 708 extend from outer surface 702 to engage female threads 532 of connector 116. Below threads 708, outer surface 702 widens into a shoulder 710. Nipple 118 defines an O-ring gap for third O-ring 128 between the shoulder 710 and male threads 708. Below shoulder 710, outer surface 702 narrows to define an O-ring gap 712 for fourth O-ring 130.

Figure 8:
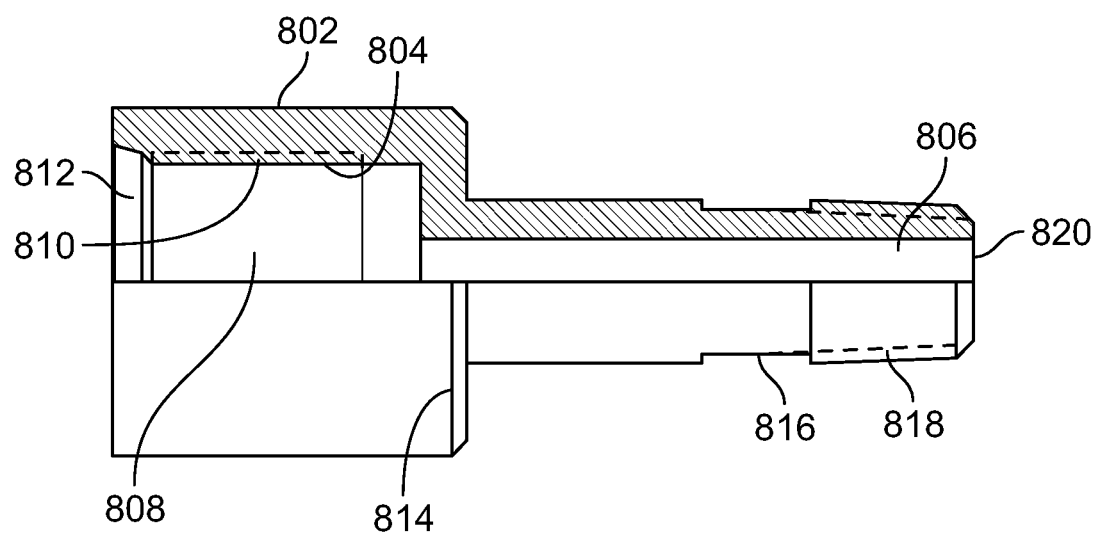
FIG. 8 is a partially cross-sectional view of the end connector of the fluid coupler of FIG. 1.

As shown in FIG. 8, end connector 102 has an outer surface 802 and an inner surface 804 defining a generally cylindrical fluid void 806 and a generally cylindrical inner body chamber 808. Inner surface 804 defining inner body chamber 808 includes female threads 810, configured to receive the male threads 308 of inner body 110. Below female threads 810, inner surface 804 narrows to define an O-ring gap 812 for first O-ring 122.

Outer surface 802 narrows to define a shoulder 814. Above shoulder 814, the outer surface slightly narrows to define wrench flats 816. Male threads 818 extend from outer surface 802 above the wrench flats 816. Beginning at male threads 818, the outer surface gently narrows until reaching a tip 820. Male threads 818 are configured to engage corresponding female threads defined on an inner circumferential surface of the hose (not shown).

Figure 9:
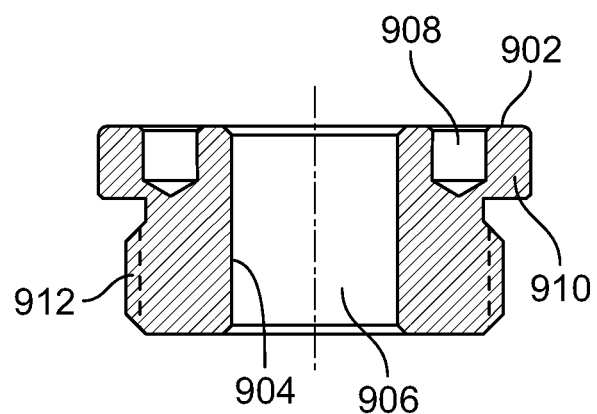
FIG. 9 is a cross-sectional view of the end cap of the fluid coupler of FIG. 1.

The end cap 104, shown in FIG. 9, has an outer surface 902 and an inner surface 904 defining a generally cylindrical end connector void 906. A top surface of end cap 104 defines at least two recesses 908. As shown in FIG. 1, end connector 102 fits through end connector void 906. Outer surface 902 of the end cap 104 narrows at a shoulder 910. Male threads 912 extend from outer surface 902 below shoulder 910 and fit into female threads 206 of outer body 108.

With reference to FIG. 1, wear plate 120 fits between end connector 102 and end cap 104. The wear plate can be unfastened, fastened to the bottom of the end cap 104, or fastened to end connector 102.

Figure 10:
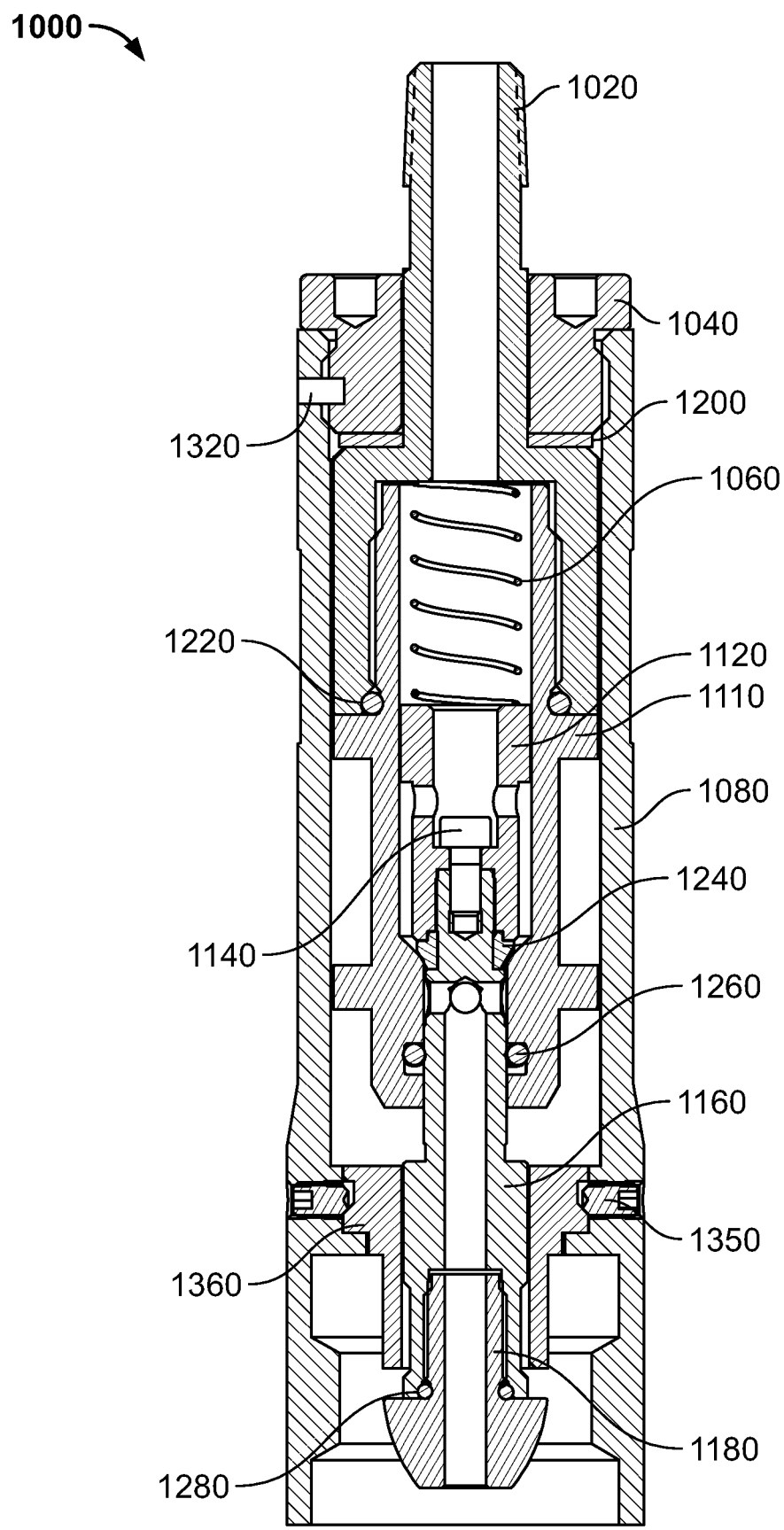
FIG. 10 is a cross-sectional view of a second embodiment of a fluid coupler in accordance with the teachings herein.
Figure 11:
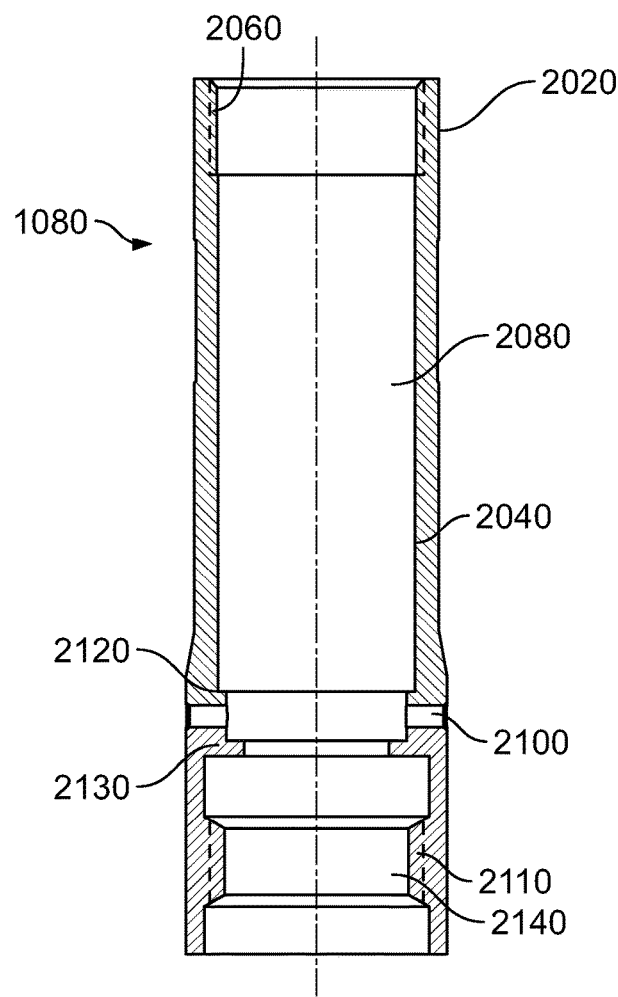
FIG. 11 is a cross-sectional view of the body of the fluid coupler of FIG. 10.
Figure 12:
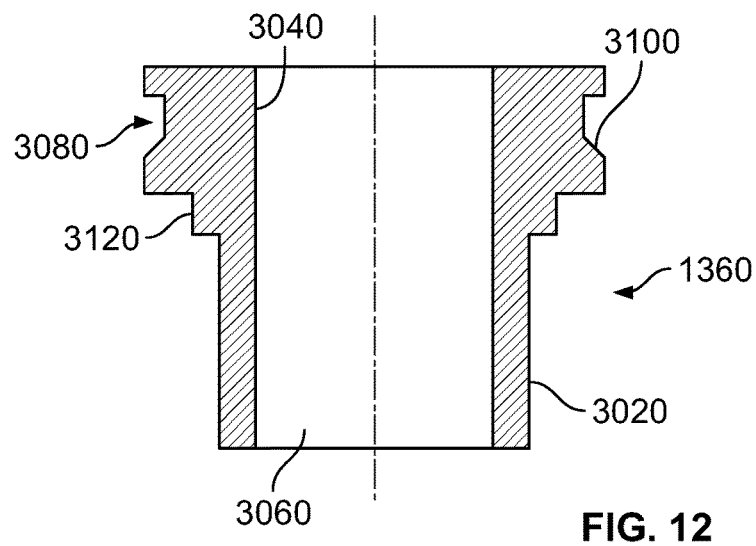
FIG. 12 is a cross-sectional view of the stop of the fluid coupler of FIG. 10.

A second embodiment of the fluid coupler 1000 is shown and described herein with reference to FIGS. 10, 11 and 12. It should be appreciated that some elements and features of fluid coupler 1000 are similar to some elements and features of the fluid coupler 100 of the first embodiment. The above detailed description of the elements and features of the first embodiment applies to the similar elements and features of the second embodiment.

As shown in FIG. 10, fluid coupler 1000 includes an end connector 1020 rotatably received in an outer body 1080. An end cap 1040 is secured to the body via a pin 1320. A circular wear plate 1200 sits between end connector 1020 and end cap 1040.

An inner body 1100 threads into end connector 1020, enabling the assembly of end connector 1020 and inner body 1100 to rotate and slide with respect to outer body 1080. A seat holder 1120 fits inside inner body 1100 and a pin or screw 1140 binds seat holder 1120 to connector 1160. A valve seat 1240 fits around connector 1160 directly underneath seat holder 1120, and a spring 1060 is disposed in inner body 110 between seat holder 1120 and end connector 1020 to bias valve seat 1240 to a closed position. A nipple 1180 threads in a bottom of connector 1160. The assembly of end connector 1020, spring 1060, and inner body 1110 may slide and rotate with respect to the outer body 1080 and end cap 1040. The assembly of seat holder 1120 and connector 1160 may slide and rotate with respect to outer body 1080 and inner body 1100. Seat holder 1120 may also be referred to as a plug holder, and valve seat 1240 may also be referred to as a plug.

A first O-ring 1220 is located around the inner body 1100 in a gap defined by the end connector 1020, and a second O-ring 1260 is located around connector 1160 in a gap defined by inner body 1100. A third O-ring 1280 is located around nipple 1180 in a gap defined by connector 1160. As shown in FIG. 10, fluid coupler 1000, excluding pin 1320, is generally symmetrical about its longitudinal axis.

In the second embodiment, outer body 1080 has a different structure as compared with outer body 108 of the first embodiment. In particular, a bottom of outer body 1080 includes male threads facing inward, instead of outward as compared with the first embodiment shown in FIG. 1. This enables the fluid coupler 1000 to engage a gas cylinder having a receiving slot with external female threads. As a result, in the second embodiment, outer body 1080 does not contact an outer surface of the connector 1160. Instead, the second embodiment includes a stop 1360 configured to contact an outer surface of connector 1160 to align connector 1160 in the longitudinal direction. One or more set screws 1350 lock stop 1360 to outer body 1080.

In the second embodiment, nipple 1180 has a different structure as compared with nipple 118 of the first embodiment. In particular, nipple 1180 does not include a fourth O-ring or a corresponding O-ring gap.

With reference to FIG. 11, outer body 1080 includes an outer surface 2020 and an inner surface 2040 defining a generally cylindrical inner cavity 2080. Inner surface 2040 extends inward to form a stop receiving shoulder 2120. Outer body 1080 defines two set screw openings 2100 configured to receive set screws 1350. Although two set screw openings 2100 are shown, it should be appreciated that other embodiments may define any suitable number of set screw openings 2100.

Below set screw openings 2100, inner surface 2040 extends inward to form second stop receiving shoulder 2130. Inner surface 2040 then radially retreats or recedes to define a generally cylindrical receiving slot void 2140. Male threads 2110 extend from inner surface 2040 defining receiving slot void 2140.

FIG. 12 shows the stop 1360 including an outer surface 3020 and an inner surface 3040 defining a generally cylindrical connector void 3060. The outer surface 3020 defines set screw stops 3080 configured to receive the set screws 1350, as shown in FIG. 10.

Set screw stops 3080 include a sloped stopping surface 3100 configured to contact tips of set screws 1350. Upon contact and engagement with set screw stops 3080, set screws 1350 apply force in a downward and lateral direction generally perpendicular to sloped stopping surface 3100.

In one embodiment, set screws 1350 do not apply an upward force against the set screw stops 3080. This feature is advantageous because set screw openings 2100 may be misaligned during manufacturing. More specifically, one set screw opening 2100 may be slightly higher than the other set screw opening 2100 and/or one set screw opening 2100 may extend at a slightly different angle than the other set screw opening 2100.

In general, for an object to rotate about a fixed point, both an upward force and a downward force must be applied against the object.

If set screw openings 2100 were misaligned and set screws 1350 could transmit force in a vertical direction, stop 1360 could rotate with respect to the longitudinal axis of the outer body 1080, inducing undesirable stresses in at least stop 1360 and connector 1160. In the present embodiment, a slight manufacturing misalignment between set screw openings 2100 would cause stop 1360 to rotate substantially less (if at all) with respect to the longitudinal axis of outer body 1080 because set screws 1350 would not apply an upward force against set screw stop 3080. In other words, the present embodiment enables a firm, substantially square contact between step 3120 and stop receiving shoulder 2130 even when set screw openings 2100 are misaligned.

As discussed above, nipple 1180 of this second embodiment lacks O-ring gap 712 of nipple 118 of the first embodiment, shown in FIG. 7. Nipples 1180 and 118 are otherwise substantially similar.

The above disclosure generally refers to elements with male threads or female threads. It should be appreciated that in other embodiments, the male threads and the female threads may be switched.

Additionally, although specific embodiments have been illustrated and described herein, it will be appreciated by those of ordinary skill in the art and others, that a wide variety of alternate and/or equivalent implementations may be substituted for the specific embodiment shown and described without departing from the scope of the embodiments described herein. This application is intended to cover any adaptations or variations of the embodiment discussed herein. While various embodiments have been illustrated and described, as noted above, many changes can be made without departing from the spirit and scope of the embodiments described herein.

What is claimed is:

1. A fluid coupler comprising:
an outer body;
a first flow unit partially disposed in and slidably engaged with the outer body; and
a second flow unit partially disposed in and slidably engaged with the first flow unit, wherein the second flow unit includes a plug that is configured to selectively sealingly engage with the first flow unit, wherein the second flow unit defines a first aperture upstream of the plug and a radial aperture downstream of the plug, wherein the first aperture is in fluid communication with the radial aperture when the plug is disengaged from the first flow unit;
wherein the first and second flow units define a fluid flow path isolated from the outer body.

2. The fluid coupler of claim 1, wherein the second flow unit is slidably engaged with the outer body.

3. The fluid coupler of claim 1, wherein the radial aperture defines a portion of the fluid flow path and is in selective fluid communication with a void between the first flow unit and the second flow unit when the plug is in an open position.

4. The fluid coupler of claim 1, further comprising a stop disposed in the outer body and about the second flow unit, the stop being slidably engaged with the second flow unit.

5. The fluid coupler of claim 1, wherein the second flow unit further comprises a plug holder disposed in and slidably engaged with the first flow unit and a connector connected to the plug holder and slidably engaged with the first flow unit.

6. A fluid coupler, comprising:
an outer body;
a first flow unit partially disposed in and slidably engaged with the outer body; and
a second flow unit partially disposed in and slidably engaged with the first flow unit, wherein the second flow unit includes a plug, wherein the second flow unit defines a first aperture upstream of the plug and a radial aperture downstream of the plug; and
a nipple engaged with the second flow unit to limit axial movement of the second flow unit, wherein the first flow unit, the second flow unit, and the nipple define a fluid flow path isolated from the outer body.

7. A fluid coupler comprising:
an outer body;
a first flow unit partially disposed in and slidably engaged with the outer body; and
a second flow unit partially disposed in and slidably engaged with the first flow unit, wherein the second flow unit includes a movable sealing structure, wherein the second flow unit defines a first aperture upstream of the movable sealing structure and a radial aperture downstream of the movable sealing structure, wherein the first and second flow units define a fluid flow path isolated from the outer body; and
an end cap engaged with the outer body, wherein the first flow unit extends through and is slidably engaged with the end cap.

8. The fluid coupler of claim 7, further comprising a wear plate disposed about the first flow unit and between the end cap and the first flow unit.

9. A fluid coupler comprising:
an outer body;
a first flow unit partially disposed in and slidably engaged with the outer body, wherein the first flow unit comprises an end connector slidably engaged in the outer body and an inner body connected to the end connector and slidably engaged in the outer body; and
a second flow unit partially disposed in and slidably engaged with the first flow unit, wherein the second flow unit includes a movable sealing structure, wherein the second flow unit defines a first aperture upstream of the movable sealing structure and a radial aperture downstream of the movable sealing structure;
wherein the first and second flow units define a fluid flow path isolated from the outer body.

10. The fluid coupler of claim 9, wherein the movable sealing structure comprises a plug, and wherein the second flow unit further comprises a plug holder slidably engaged in the inner body and a connector connected to the plug holder and slidably engaged with the inner body.

11. A fluid coupler comprising:
an outer body comprising an inner receiving shoulder;
a stop disposed in the outer body, the stop comprising a circumferential sloped stopping surface;
a set screw extending through the outer body to engage the circumferential sloped stopping surface to secure the stop against the inner receiving shoulder;
a first flow unit partially disposed in and slidably engaged with the outer body; and
a second flow unit partially disposed in and slidably engaged with the first flow unit and the stop, wherein the first and second flow units define a fluid flow path isolated from the outer body.

12. The fluid coupler of claim 11, wherein the circumferential sloped stopping surface translates radial pressure applied by the set screw to the stop into axial pressure applied by the stop to the inner receiving shoulder.

13. The fluid coupler of claim 11, wherein the stop aligns and guides the second flow unit.

14. The fluid coupler of claim 11, further comprising a nipple engaged with the second flow unit to limit axial movement of the second flow unit.

15. The fluid coupler of claim 11, wherein the second flow unit defines a radially extending vent and wherein the radially extending vent defines a portion of the fluid flow path; and the radially extending vent is in selective fluid communication with a void between the first and second flow units.

16. The fluid coupler of claim 11, wherein:
the first and second flow units define a first void between the first and second flow units;

the second flow unit defines a second void, and the second flow unit further defines a radially extending third void in fluid communication with the first and second voids.

17. A fluid coupler comprising:
an outer body comprising an inner receiving shoulder;
a stop engaged with the inner receiving shoulder, the stop comprising a circumferential sloped stopping surface;
a set screw extending through the outer body to engage the circumferential sloped stopping surface to rotationally secure the stop relative to the outer body;
a first flow unit partially disposed in and slidably engaged with the outer body, the first flow unit defining a gap;
a second flow unit partially disposed in and slidably engaged with the first flow unit and the stop; and
a seal disposed in the gap and sealingly engaged with the second flow unit, the seal isolating a fluid flow path through the first and second flow units from the outer body.

18. The fluid coupler of claim 17, wherein the circumferential sloped stopping surface translates radial pressure applied by the set screw to the stop into axial pressure applied by the stop to the inner receiving shoulder to secure the stop against the inner receiving shoulder.

19. The fluid coupler of claim 17, wherein:
the second flow unit defines a radially extending vent;
the radially extending vent defines a portion of the fluid flow path; and
the radially extending vent is in selective fluid communication with a void between the first and second flow units.

* * * * *